United States Patent [19]

Messmore

[11] Patent Number: 4,601,665

[45] Date of Patent: Jul. 22, 1986

[54] CARDIAC TRAINING MANNIKIN

[76] Inventor: Francis B. Messmore, 130 E. 67th St., New York, N.Y. 10021

[21] Appl. No.: 718,841

[22] Filed: Apr. 1, 1985

[51] Int. Cl.⁴ ............................................. G09B 23/32
[52] U.S. Cl. .................................................. 434/267
[58] Field of Search ......................... 434/266, 267, 265

[56] References Cited

U.S. PATENT DOCUMENTS 3,520,071 7/1970 Abrahamson et al. ............. 434/265
3,662,076 5/1972 Gordon et al. ................. 434/267 X Primary Examiner—Harland S. Skogquist
Attorney, Agent, or Firm—Howard C. Miskin

[57] ABSTRACT

A cardiovascular examination training aid includes a mannikin with a flexible wall animated by a group of electromechanical linear transducers which are energized in accordance with the program in a selected ROM cartridge of a group and whose output is timed by a variable frequency clock and corresponds to a desired cardiovascular condition. Also controlled by the selected cartridge program is a pulse or heart sound produced in a stethoscope in accordance with the area of application of the stethoscope and the program in the selected cartridge. Blood pressure is measured by producing a pulse audio signal for the brachial artery region and applying a pressure cuff to the region and applying the signal to the stethoscope only when the cuff pressure is within a range established by the cartridge program.

15 Claims, 5 Drawing Figures

CARDIAC TRAINING MANNIKIN

BACKGROUND OF THE INVENTION

The present invention relates generally to improvements in teaching aids and it relates particularly to an improved mannikin animated to simulate various physiological conditions and disorders.

The traditional practice for the training and testing of students in bedside diagnosis and the examination and monitoring of patients involves the employment of patients or subjects having the particular physiological conditions or disorders. However, while such training practice is of optimum value it is difficult to properly achieve since the availability of patients possessing the various conditions and disorders under study or observation at suitable times presents many problems even in large medical centers. Moreover, even when such patients are available, their well being, comfort and privacy are of primary importance and their repeated examination by feel, observation and with stethoscopes, sphygmomanometers and other instruments should be avoided.

Teaching aids of many types have been heretofore proposed and available to avoid the problems encountered by the use of actual subjects or patients but these possess numerous drawbacks.

Such a training apparatus which has achieved a considerable degree of acceptance is described in U.S. Pat. No. 3,662,076 granted Sept. 26, 1972 to Gordon and Messmore and consists of a mannikin animated to simulate the conditions of many different disorders and a sound system providing in synchronism therewith the heart and pulse sounds accompanying such disorders. However, this training mannikin apparatus possesses many disadvantages. The animating mechanism is mechanically bulky and complicated, highly inefficient and awkward and inconvenient to adjust and of little versatility and adaptability. The sound generating system associated with the animating mechanism is likewise awkward and bulky and of little versatility and otherwise leaves much to be desired.

SUMMARY OF THE INVENTION

It is a principal object of the present invention to provide an improved teaching aid.

Another object of the present invention is to provide an improved aid for teaching the bedside or non-invasive examination and diagnosis of various cardiovascular conditions, both normal and abnormal and related physiological conditions.

Still another object of the present invention is to provide an improved animated mannikin and associated sound generating system for teaching the recognition of various cardiovascular and related disorders without the employment of human patients or subjects.

A further object of the present invention is to provide an improved mannikin animated to simulate the movements of different body areas and to provide the associated pulse and heart sounds at various body areas corresponding to different selected cardiovascular and related disorders.

Still a further object of the present invention is to provide an improved apparatus of the above nature characterized by its high precision and its high fidelity to selected cardiovascular conditions, the absence of noise and mechanical vibration, its ease and convenience of operation, its great reliability and high versatility and adaptability.

The above and other objects of the present invention will become apparent from a reading of the following description taken in conjunction with the accompanying drawings.

A teaching apparatus in accordance with the present invention includes a mannikin simulating at least part of the human torso and having a movable, preferably resilient, outer wall, a plurality of electromechanical outputs coupled to different parts of the torso outer wall, a memory device digitally storing a predetermined motion program, computer means programmed by the memory device and having a plurality of analog electrical output signals responsive to the programs and means for individually energizing the transducers in response to the analog output signals to move respective torso wall parts in a program predetermined manner. In addition the memory device stores a sound generating program for synchronously generating sounds for different parts of the torso in preset relationship to the motion program.

In the preferred form of the teaching apparatus the memory stores a plurality of motion and sound programs corresponding to respective cardiovascular conditions each of the programs being stored in a section of the memory or in a ROM or non-volatile RAM cartridge constituting part of the memory. Selector means are provided for coupling or activating a desired memory stored program and the digital output motion signals separated in accordance with the motivated torso part and each such signal converted to an analog signal which is amplified and energizes a solenoid actuated plunger to correspondingly motivate a respective torso part. A sound control activated in response to the proximity of an earphone carrying stethoscope to a portion of the sound output signals corresponding to such torso part and the selected output signal controls a frequency synthesizer and modulator to produce a corresponding modulated audio signal which energizes the earphone. Also provided is a sphygmomanometer device and a pressure transducer and converter for providing a digital output which is displayed and compared to a program produced diastolic systolic range to actuate or deactuate a corresponding pulse sound signal from a respective memory to the stethoscope earphone.

The improved teaching apparatus is rugged, reliable, of high fidelity and precision, contains a minimum of moving parts and is substantially free of noise and mechanical vibration, is easy and convenient to use, is of relatively low cost, is highly compact and of great versatility and adaptability.

DESCRIPTION OF THE PREFERRED EMBODIMENT

Figure 1:
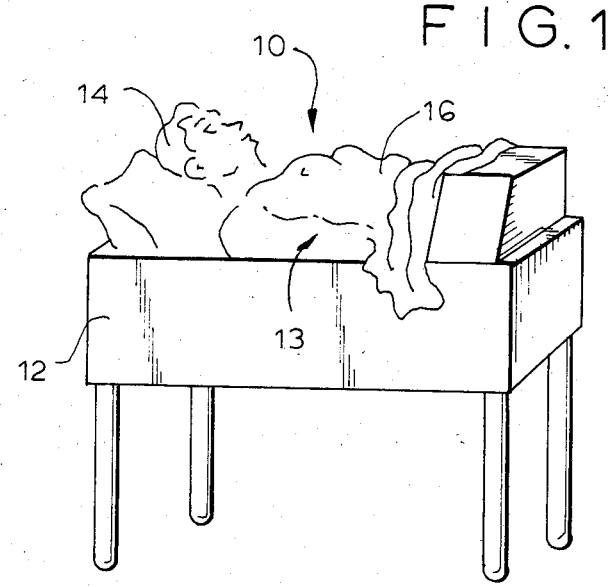
FIG. 1 is a front perspective view of a training mannikin in accordance with the present invention.
Figure 2:
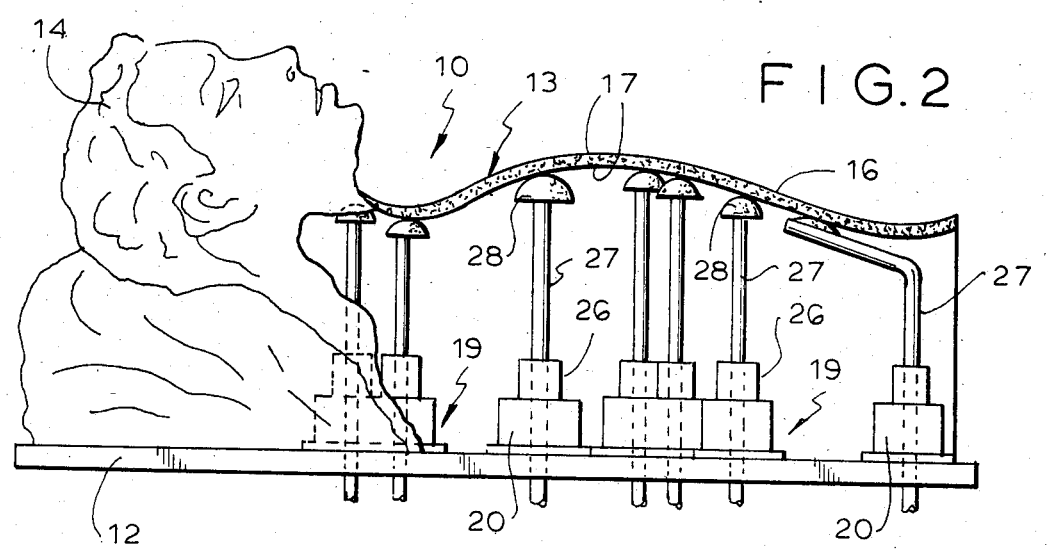
FIG. 2 is an enlarged partially longitudinally sectional view thereof.
Figure 3:
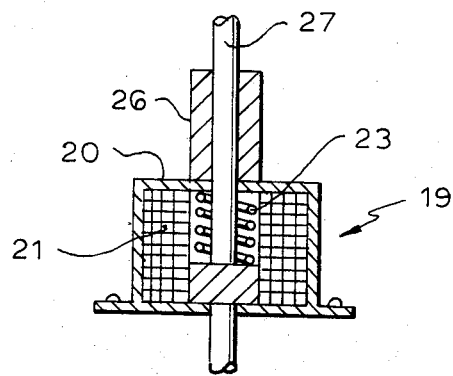
FIG. 3 is a vertical sectional view of one of the electromechanical transducers animating the mannikin wall.

Referring now to the drawings which illustrate a preferred embodiment of the present invention, the reference numeral 10 generally designates the improved teaching mannikin which is backed by a leg mounted folded display panel 11 carrying any desired information and representations relating to the mannikin 10, its operation and the various conditions presented and demonstrated by the mannikin, the display panel forming no part of the present invention. The mannikin 10 which simulates the human torso is supported at a suitable height on a table top or platform 12 and includes a hollow body portion 13, a head portion 14 and arms 16, the mannikin being supine with the head portion on a pillow similar to a bed resting patient. Body portion 12 includes a resiliently deformable top wall 17 with an outer face having the feel and texture of human skin and of the nature described in U.S. Pat. No. 3,662,076.

Located within body portion 13 and mounted on platform 12 are a plurality of electromechanical transducers 19 preferably having linear mechanical electrical responses. Each transducer 19 includes a cylindrical case 20 having coaxial central openings in its top and bottom end walls, the bottom wall including outer lugs which are screw fastened to platform 12. Housed within case 20 is a solenoid 21 having an axial bore coaxial with and of greater diameter than the case top and bottom wall central openings. A cylindrical armature 22 which may be a permanent magnet or of a ferromagnetic material slidably telescopes the solenoid bore and is of lesser height than the bore, a helical compression spring 23 being entrapped between the top face of armature 23 and the inner border of the case wall top wall surrounding the opening therein. A slide bearing 26 is mounted atop the case top wall coaxial with and of the same diameter as the central opening therein and a push rod 27 projects upwardly and downwardly from each armature 22 the upper part of rod 27 slidably engaging and extending above slide bearing 27. Mounted atop each push rod 27 is an enlarged head 28 with a convex top face, each head 28 engaging the underface of body member top wall 17 in preselected areas, for example those corresponding in location to the locations of the right and left ventricles, the aorta, the pulmonary artery, the ectopic area, etc.

Figure 4:
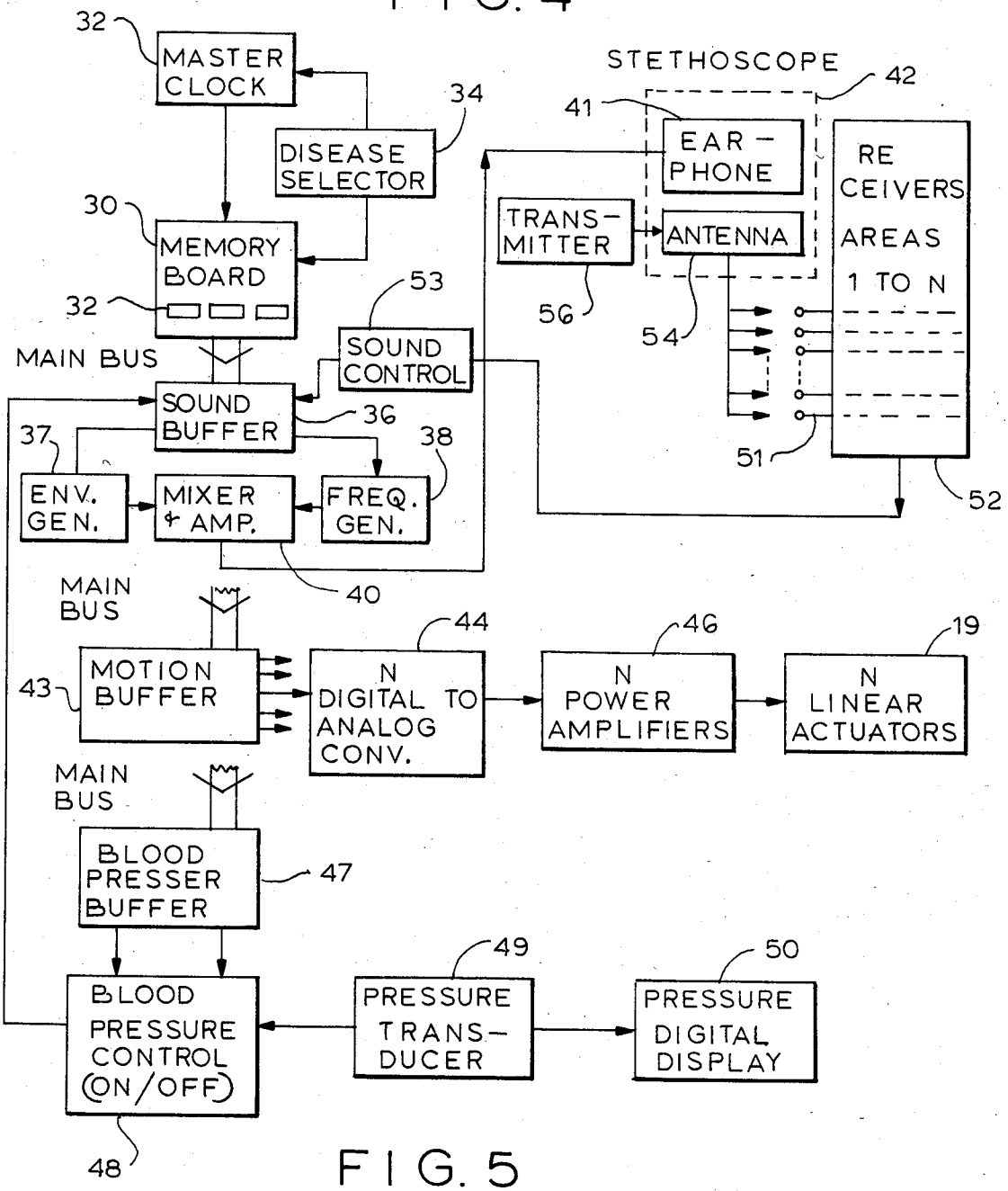
FIG. 4 is a block diagram of the mannikin animation and sound generating control network.

The network for controlling the energization of the transducers 19 and the generation of the heart and pulse sounds at different areas of the torso is illustrated in FIG. 4 and includes a main memory board 30 containing a plurality of program sections or devices 32 which may be ROM cartridges or other suitable non-volatile program storage devices or sections, each cartridge 32 containing the program information of a different cardiovascular disorder or condition for the individual energization of each of the motion transducers 19 and the generation of the sounds audited by stethoscope at the different parts of the torso as well as at the area of the brachial artery for simulated blood pressure measurements. A master clock 33 of adjustable or variable frequency output is inputed to the memory board 30 to time and sequence the program data of cartridge 32 selected by a selector switch device 34 connected to memory board 30 for manually alternatively selecting or effecting the actuation of an individual cartridge 32 corresponding to the desired disorder or condition, and is also connected to the frequency control input of clock 33. The output of memory board 30, that is a selector activated cartridge 32, is connected by the main bus through a sound buffer 36 passing the amplitude and frequency sound control digital signals corresponding to a selected torso area respectively to an amplitude control or envelope generator 37 and to an audio frequency generator or synthesizer 38. The outputs of generators 37 and 38 are connected to a mixer and amplifier network 40 and the amplified modulated audio output is connected to the earphone 41 of a stethoscope 42.

Figure 5:
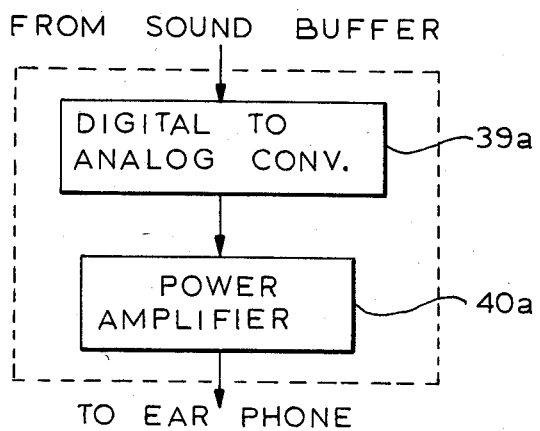
FIG. 5 is a block diagram of a modified portion of the network shown in FIG. 4.

Alternatively, as shown in FIG. 5, the output of memory board 30 may be connected through the sound buffer 36 to the input of a digital to analog converter 39a whose analog output is coupled through a power amplifier 40a to the electrically energized earphone 41 of stethescope 42. The modification shown in FIG. 5 is used to advantage for among other reasons that it provides a greater range of sound.

Also connected to a selected activated cartridge 32 of memory board 30 by the main bus is a motion signal buffer 43 passing and separating the torso motion digital signals, the signals from each output of motion signal buffer 43 being connected through a respective digital to analog converter 44 to amplifier 46 whose output is connected to a respective motion transducer or linear actuator 19.

A blood pressure buffer 47 is connected by the main bus to the output of memory board 30 and passes blood pressure digital signals delineating the blood pressure digital signals delineating the blood pressure range between the diastolic and systolic points to a blood pressure on/off control switch 48 to which the digital output of a sphygmomanometer pressure transducer and analog to digital converter 49 is connected, switch 48 being actuated when the output of transducer 49 lies in the pressure range between the diastolic and systolic points. The output of control 48 is connected to sound buffer 36 to block the pulse sound signals corresponding to the brachial artery area when the pressure transducer output is outside the programmed diastolic systolic range. The pressure transducer 49 is also connected to a digital display device 50 providing a digital reading of the sphygmomanometer pressure in the associated pressure cuff.

In order to energize earphone 41 with an audio signal determined by the area of the torso to which the stethoscope is applied there is provided a plurality of RF pickups 51 located in selected areas of the torso each being connected to a respective receiver 52 which produces a corresponding output signal which is connected to the input of a sound control device 53. The output of sound control device 53 is connected to sound buffer 36 to block the passing of all sound signals except that selected by sound control 53 in response to an input from a receiver 52. Located in the pickup head of stethoscope 42 is an antenna 54 which is connected to the output of an RF transmitter 56 so that when the stethoscope 42 is applied to an area of the torso the RF signal is picked up and actuates a corresponding receiver 52 which controls sound buffer 36 to pass a respective sound signal.

In the operation of the improved training mannikin 10 described above the operator merely adjusts the disease selector 34 to the desired disorder or condition to be observed and the powered device energizes the transducers 19 in a manner to cyclically move the different areas of the torso in a manner corresponding to the selected disorder or condition as controlled by a respective cartridge 32. By applying the stethecope 42 to different areas of the torso a corresponding receiver responds to the picked up RF signal to control buffer 36 to pass the respective sound signal which energizes earphone 41 to produce a sound corresponding to the sound associated with the audited area of the selected disorder. In practicing the measurement of the blood pressure, the sphygmomanometer pressure cuff is applied to the mannikin's arm above the brachial artery, inflated and then leaked. The cuff pressure is shown on display 50 and when the systolic pressure is reached pressure control 48 is actuated to signal buffer 36 to pass pulse sound signals to correspondingly energize earphone 41 thereby indicating the systolic pressure and when the diastolic pressure is reached as sensed by control 48 the pulse sound is discontinued. It should be noted that the pulse rate as well as other cycle rates may be varied by varying the pulse frequency output of master clock 33.

While there has been described and illustrated a preferred embodiment of the present invention, it is apparent that numerous alterations, omissions and additions may be made without departing from the spirit thereof.

I claim:

1. A teaching device comprising a mannikin having a movable outer wall, a plurality of electromechanical transducers having mechanical outputs coupled to different parts of said outer wall, a memory device digitally storing a predetermined program, control means programmed by said memory device and having a plurality of analog electrical output signals responsive to said program, means for individually energizing said transducers in response to said output signals to move said respective wall parts in a predetermined manner, a stethoscope applicable to different parts of said mannikin, and audio means responsive to the applied position of said stethoscope to said mannikin for supplying an audible signal to said stethoscope in accordance with a corresponding part of said digital program, said audio means including a sound synthesizer coupled to the output of said control means and producing on audio signal of a frequency responsive to its digital signal input and a modulator for varying the amplitude envelope of said audio signal in response to the controller means output signal.

2. The teaching device of claim 1 including a plurality of said digitally stored programs and means programming said control means by a selected program.

3. The teaching device of claim 1 including a plurality of said memory devices each digitally storing a respective predetermined program and means for operatively coupling a selected of said memory devices to said control means.

4. The teaching device of claim 1 wherein said audio means includes sensing elements located at different parts of said mannikin wall and individually responsive to the proximity of said stethoscope and means responsive to said sensing devices for supplying said corresponding audio signal to said stethoscope.

5. The teaching device of claim 1 wherein said memory device stores a plurality of said programs corresponding to respective cardiovascular disorders and selection means for selectively activating alternative individual programs.

6. The teaching device of claim 1 wherein said memory device includes a plurality of cartridges, each of said cartridges non-volatilily storing one of said programs and said selection means selectively activates alternative individual programs.

7. The teaching device of claim 5 wherein said control means includes a motion signal buffer coupled to said memory device and passing and separating digital motion signals for each of said transducers to respective outputs and means including digital to analog converters for coupling each of said transducers to said respective outputs.

8. The teaching device of claim 5 wherein each of said programs includes an audio section including a plurality of area related audio portions and further comprising an earphone, audio control means including an audio buffer coupled to said memory device and sound control means for controlling said audio buffer to selectively alternatively pass individual audio portions and means coupled to the output of said audio buffer for energizing said earphone.

9. The teaching device of claim 8 comprising a stethoscope carrying said earphone, said sound control means being responsive to the area of application of said stethoscope to said torso for passing a corresponding audio signal portion.

10. The teaching device of claim 8 wherein said earphone energizing means includes an amplitude modulated audio frequency synthesizer connected to the output of said audio buffer and having an audio output connected to said earphone.

11. The teaching device of claim 1 comprising sphygmomanometer means for applying and varying the pressure above the brachial artery region of said mannikin, means indicating the value of said pressure, means responsive to said memory device for establishing a predetermined pressure range and means responsive to said applied pressure being outside said pressure range for disabling the supply of an audio signal to said stethoscope when in the area of said brachial artery.

12. A teaching device comprising a mannikin having a movable outer wall, a plurality of electromechanical transducers having mechanical outputs coupled to different parts of said outer wall, a memory device digitally storing a predetermined program, control means programmed by said memory device and having a plurality of analog electrical output signals responsive to said program, means for individually energizing said transducers in response to said output signals to move said respective wall parts in a predetermined manner, a stethoscope applicable to different parts of said mannikin, and audio means responsive to the applied position of said stethoscope to said mannikin for supplying an audible signal to said stethoscope in accordance with a corresponding part of said digital program, said audio means including sensing elements located at different parts of said mannikin wall and individually responsive to the proximity of said stethoscope and means responsive to said sensing devices for supplying said corresponding audio signal to said stethoscope.

13. The teaching device of claim 12 wherein said stethoscope includes an electrically responsive earphone, said audio signal being applied to the electrical input of said earphone.

14. The teaching device of claim 13 including a plurality of said digitally stored programs and means programming said control means by a selected program.

15. The teaching device of claim 13 including a plurality of said memory devices each digitally storing a respective predetermined program and means for operatively coupling a selected of said memory devices to said control means.

* * * * *